United States Patent [19]

Rog et al.

[11] 4,438,391

[45] Mar. 20, 1984

[54] ELECTRICAL SURVEY APPARATUS AND METHOD WITH SPINNER-TYPE CONDUCTOR SUPPLY

[75] Inventors: Joseph W. Rog, Medina, Ohio; Charles G. Waits, Hanover Park; Karl W. Nicholas, Roselle, both of Ill.

[73] Assignee: Harco Corporation, Medina, Ohio

[21] Appl. No.: 341,167

[22] Filed: Jan. 21, 1982

Related U.S. Application Data

[63] Continuation of Ser. No. 972,041, Dec. 21, 1978, abandoned.

[51] Int. Cl.³ .............. G01V 3/15; G01R 31/02; G01N 27/00; G01B 7/02
[52] U.S. Cl. .............. 324/71.1; 33/132 R; 324/72; 324/348; 364/562; 377/24
[58] Field of Search ........ 324/72, 71 R, 166, 54, 324/171–175, 348, 65 CR, 363, 323, 425; 33/129, 132, 136, 139, 141 R, 141 E; 235/92 DN; 340/675–677; 364/562

[56] References Cited

U.S. PATENT DOCUMENTS

| | | | |
|---|---|---|---|
| 610,846 | 9/1898 | Hubbard | 33/132 |
| 1,962,757 | 6/1934 | Baker | 33/136 X |
| 2,105,247 | 1/1938 | Jakosky | 324/363 |
| 2,256,742 | 9/1941 | Jakosky | 324/363 X |
| 2,874,477 | 2/1959 | McConnell | 33/129 |
| 3,739,276 | 6/1973 | Dornberger | 340/677 X |
| 3,750,130 | 7/1973 | Lute | 340/677 X |
| 4,151,458 | 4/1979 | Seager | 324/72 X |
| 4,185,390 | 1/1980 | Tateishi | 235/92 DN X |

Primary Examiner—Gerard R. Strecker
Attorney, Agent, or Firm—Maky, Renner, Otto & Boisselle

[57] ABSTRACT

The apparatus and method of the present invention facilitate surveys of buried structures, such as pipelines or the like, in particular by substantially automatically measuring and indicating distance information. Preferably that information is obtained by a transducer that produces serial data representing the length of wire bailed out from a portable reel and a cyclical counter responsive to such data for counting the serial data. A signalling device, such as a horn, strobe light, etc., is activated each time the counter completes a cycle as an indication that a predetermined distance has been covered since the last measurement was made and that the next potential measurement should be made. The number of pulses of such serial data counted in each cycle of the counter can be manually adjusted to obtain small or large distance intervals between test locations at which potential or other measurements are to be made to obtain a substantially continuous survey of the pipeline.

45 Claims, 7 Drawing Figures

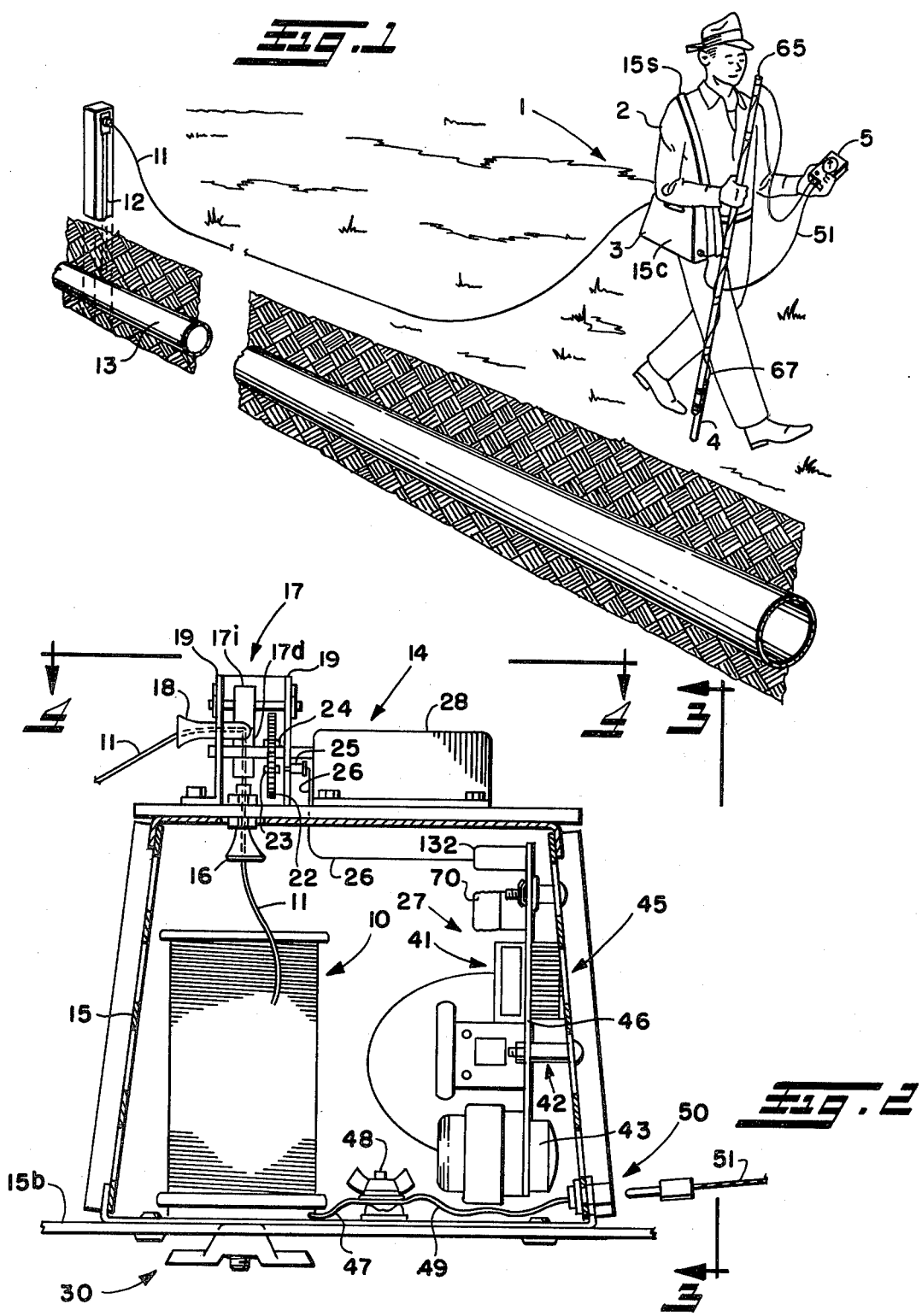

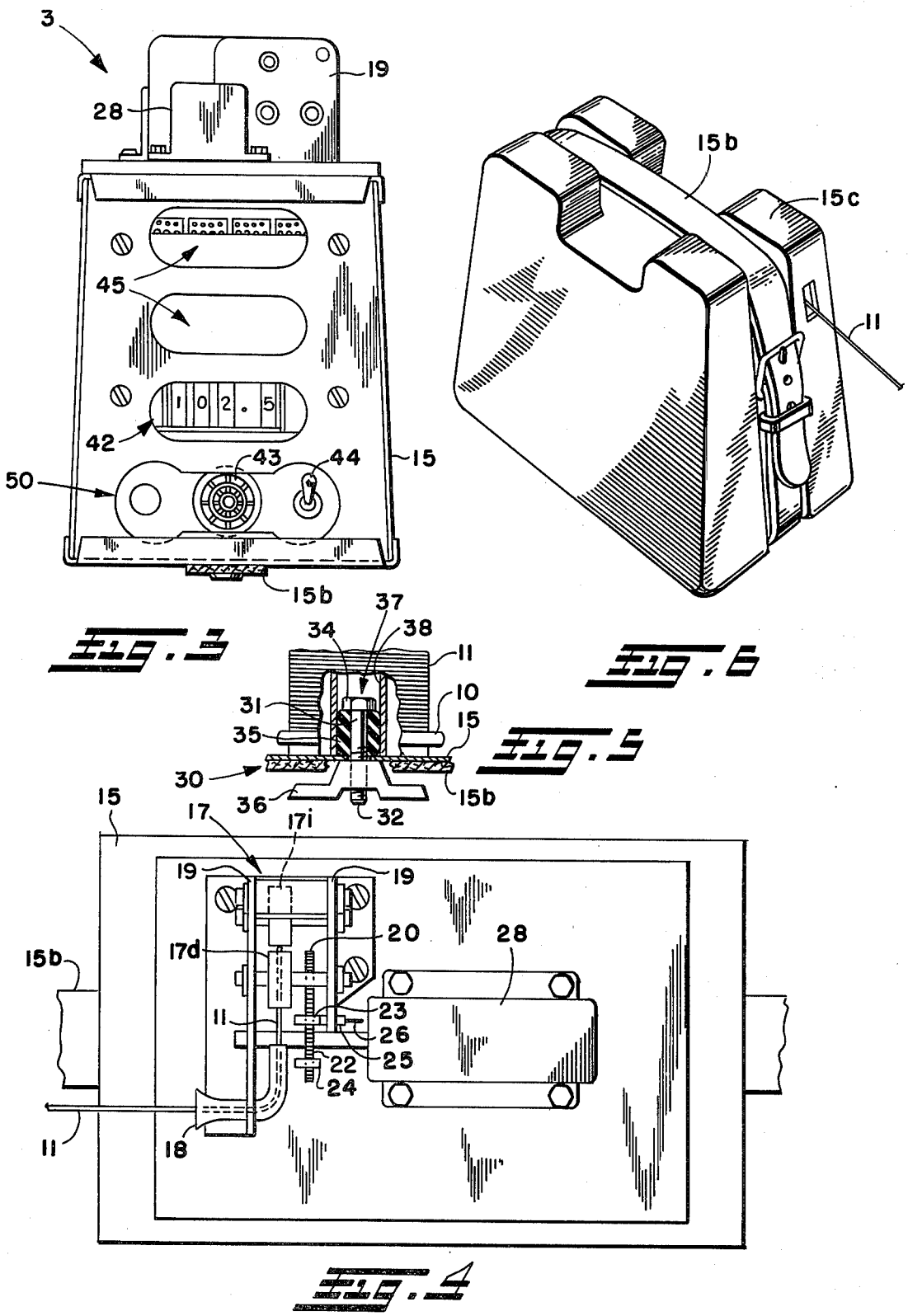

ELECTRICAL SURVEY APPARATUS AND METHOD WITH SPINNER-TYPE CONDUCTOR SUPPLY

This is a continuation of application Ser. No. 972,041, filed Dec. 21, 1978, now abandoned.

TECHNICAL FIELD

The present invention relates generally to electrical type surveys of buried metal structures, such as pipelines, and, more particularly, to an electrical apparatus with an automatic distance indicating mechanism for facilitating making such surveys.

BACKGROUND OF PRIOR ART

In controlling corrosion of pipelines or elongated metal structures buried in the ground, cathodic protection techniques have been employed. To determine where cathodic protection should be applied and to assure that sufficient cathodic protection voltage is applied to the pipeline, a pipeline survey may be made by taking electrical measurements of the pipe-to-soil potential difference and/or soil resistivity at selected locations along the length of the pipeline. The data gathered in such survey can be analyzed to determine where and/or how cathodic protection can be efficiently employed to prolong the life of the pipeline.

The pipe-to-soil potential difference measurement requires a contact to the pipe, a suitable voltmeter or potentiometer, a means of contacting the ground, and connecting wires. A copper-copper sulfate (Cu-CuSO$_4$) cell is an industry standard for providing the necessary contact with the ground. Contact to the pipe usually is provided by a wire connection to a test lead, which is permanently connected to the buried pipe and is brought above ground in a protected, easily accessible location. Such test leads usually are installed along the pipeline from about one to two miles apart. Measurements are commonly made on a yearly basis at the test lead stations to obtain general information concerning the pipeline condition and its relation to the surrounding environment.

However, to obtain more complete data of the pipeline condition a more comprehensive continuous, over-the-pipeline, closely-spaced survey occasionally may be conducted to determine the pipe-to-soil potential difference, for example, at intervals of, say, 10 to 25 feet along the length of the pipe.

In the past, various techniques have been used to make such relatively closely spaced surveys. In one technique a reel of relatively heavy insulated wire was connected to the pipeline at a test lead, and the wire was dragged from the reel across the ground along the route of the pipeline. The copper-copper sulfate half cell was placed directly over the pipeline at intervals of, say, 10 to 25 feet, and both distance and potential difference measurements were taken and manually recorded. In this technique measurement inaccuracies have occurred due to static electricity accumulation on the dragged wire. Alternatively, the wire was attached to the test lead and the reel was transported by vehicle along the pipeline route. In both cases, though, some form of vehicular transportation was required for the reel and usually powered equipment was required to rewind the wire back onto the reel. Such a system, however, has a number of disadvantages. The reel transporting vehicle and the power-rewinding equipment are heavy, expensive, and consume energy, such as fuel and/or electric power. Several workers were usually required. Since many surveys are made over farm land, crops, etc., and in rough terrain, such as in rocky, mountainous, or wooded areas, across flowing streams, fences, and like impediments, the use of a vehicle often is prohibited or impossible. Also, the physical effort required to drag the heavy wire is considerable, especially when a mile of wire is manually pulled across uneven terrain. The resultant wear on the wire and frequent breakages, plus electric reel maintenence, further add to the cost of such prior systems used in the past to make pipeline surveys.

In a recently improved technique for making such relatively closely-spaced surveys a dual function economically disposable, relatively lightweight, flexible wire provides both electrical connection to the pipeline via a test lead and accurate distance measurement information to the surveyor moving along the length of the pipeline. A reel of such lightweight wire is carried by the surveyor, who may walk along the length of the pipeline, and the wire drives a distance measuring unit carried by the surveyor to display the distance from the test station. The surveyor also carries a copper-copper sulfate half cell, which is placed in contact with the ground at selected test locations, and a meter for measuring the potential difference between the wire and the half cell. A single surveyor thus makes both the distance and potential measurements and may write the values in a notebook, verbally record them on a portable tape recorder, or verbally transmit them to a proximate associate or by radio to a distant associate for recording. The wire used for connection to the test lead is not dragged over the ground; rather it is merely laid down as the reel is easily transported along the path of the pipeline. Moreover, the wire is economically disposable and need not be re-wound for re-use.

The portability of the equipment used in such improved technique facilitates the making of closely-spaced surveys, e.g. by reducing manpower and/or equipment costs over the first-mentioned technique. Also, since the equipment used is highly portable, it can be carried by a single surveyor, for example, even over rough terrains and those over which vehicular travel is prohibited. However, although having a number of advantages over the former techniques described above, nevertheless both the distance and electrical information usually have had to be visually read and manually recorded. The need for the surveyor continually to observe the distance measuring dial to assure substantially equidistant potential measurements would slow the surveyor's walking, and thus surveying pace.

BRIEF SUMMARY OF INVENTION

The apparatus and method of the present invention facilitate surveys of buried structures, such as pipelines or the like, in particular by substantially automatically measuring and indicating distance information. As used herein "buried" and/or "sub-surface" preferably mean submerged or contained within soil, i.e. underground, but also may be construed as submerged or contained in water, the soil, water, etc. being considered an electrolyte. Preferably that information is obtained by a transducer that produces serial data representing the length of wire bailed out from a portable reel and a cyclical counter responsive to such data for counting the serial data. A signalling device, such as a horn, strobe light, etc., is activated each time the counter completes a cycle as an indication that a predetermined distance has been covered since the last measurement was made and that the next potential measurement should be made. The number of pulses of such serial data counted in each cycle of the counter can be manually adjusted to obtain small or large distance intervals between test locations at which potential or other measurements are to be made to obtain a substantially continuous survey of the pipeline with much data but without the prior disadvantages of substantially slowing down the survey. Thus the present invention, while employing a number of features from the above described recently improved survey technique, is a further improvement over the latter.

Briefly, the electrical survey apparatus includes a distance measuring unit, at least one, but possibly plural, means for contacting the ground, such as the conventional copper-copper sulfate half cell, and a meter, such as a conventional meter for measuring potential difference between the buried structure, referred to below for exemplary purposes as pipeline, and the soil, although other structures may be surveyed, such as power cables, telephone cables, water mains, etc. The apparatus, in particular the automatic distance measuring portions thereof, also may be used to measure potential differences between various structures and electrolytes other than soil in which such structures are submerged, such as water. All of these components of the apparatus preferably are relatively lightweight and may be easily carried by a single surveyor walking along the pipeline right of way, although, if desired, those components may be transported by vehicle, pack animal, etc. The distance measuring unit contains a supply of disposable electrical wire, which is electrically connected to the pipeline at a test lead and is laid down along the pipeline right of way as the surveyor carries the unit therealong, a spinner-type payout or bail out mechanism for the wire, an electronic counter for measuring the length of wire paid out, adjustable input controls for selecting the distance intervals between test locations at which electrical measurements are to be made, a physical signalling, e.g. a horn, device to advise the surveyor when to make a measurement, and a reset control for the counter.

According to further aspects of the present invention the electronic portions may be isolated from the outside case of the distance measuring unit to avoid inaccuracies due to grounding through the body of the surveyor. Also, an improved spinner type wire pay out mechanism and support may be used to minimize internal tangling and breakage and to maximize integrity of electrical connection of the wire to the meter.

According to another aspect of the invention an improved counter circuit with an expansion and count discriminating facility are provided for cyclically counting serial data pulses.

According to the method of the present invention, the distance intervals between the test locations are selected, the external end of the disposable wire is connected to a test lead of the pipeline being surveyed, the system is turned on and reset for operation, and the surveyor walks along the pipeline right of way while carrying the half cell. The distance information automatically is measured and used to produce a physical signal each time measurement information is to be taken, whereupon the surveyor stops walking, places a half cell into contact with the soil, reads the potential difference or other parameter displayed on the meter, and records or directs the recording of the reading, for example, in a notebook. When the surveyor arrives at a subsequent test lead location on the pipeline, the disposable wire already on the ground may be cut off and left behind and the new end of the disposable wire in the distance measuring unit connected to the subsequent test lead so that the survey may be continued, and so on. The survey data obtained may be reconstructed later, say, in graphical form, to facilitate evaluation thereof.

With the foregoing in mind, one primary object of the invention is to facilitate the making of electrical surveys of buried metal structures, such as pipelines.

An additional object is to measure discrete distance intervals automatically and to indicate cyclically the completing of travel through each such interval.

Another primary object is to increase the amount and accuracy of data obtained during such a survey and, therefore, the information value of the survey.

A further object is to provide an improved cyclical serial data counter.

Other objects include the minimizing of the weight of the apparatus for making such a survey; the providing of versatility, for example, by conveniently varying the distance intervals between measurements; the facilitating and improving of paying out of and electrical connection of the disposable wire; the avoidance of grounding noise encountered in the past under wet conditions, for example; the allowing of such a survey to be made in conditions under which a vehicle transport system could not be used; reducing the cost for such surveys; the minimizing of crop damage; and the reducing of time required to make such surveys.

These and other objects and advantages of the present invention will become more apparent as the following description proceeds.

To the accomplishment of the foregoing and related ends, the invention, then, comprises the features hereinafter fully described in the specification and particularly pointed out in the claims, the following description and the annexed drawings setting forth in detail a certain illustrative embodiment of the invention, this being indicative, however, of but one of the various ways in which the principles of the invention may be employed.

BRIEF DESCRIPTION OF DRAWINGS

In the annexed drawings:

FIG. 1 is an environmental view showing a surveyor using the apparatus of the invention to practice the method thereof in surveying a buried pipeline;

FIG. 2 is a side elevation view, partly broken away in section, of the distance measuring unit package with its cover removed;

FIG. 3 is an end elevation view of the package of FIG. 2 looking generally in the direction of the arrows 3—3 thereof;

FIG. 4 is a top view of the package of FIG. 2, looking generally in the direction of the arrows 4—4 thereof;

FIG. 5 is a fragmentary section view of the wire spool securing mechanism in the package of FIG. 2;

FIG. 6 is an isometric view of the package; and

DESCRIPTION OF THE PREFERRED EMBODIMENT

Figure 7:
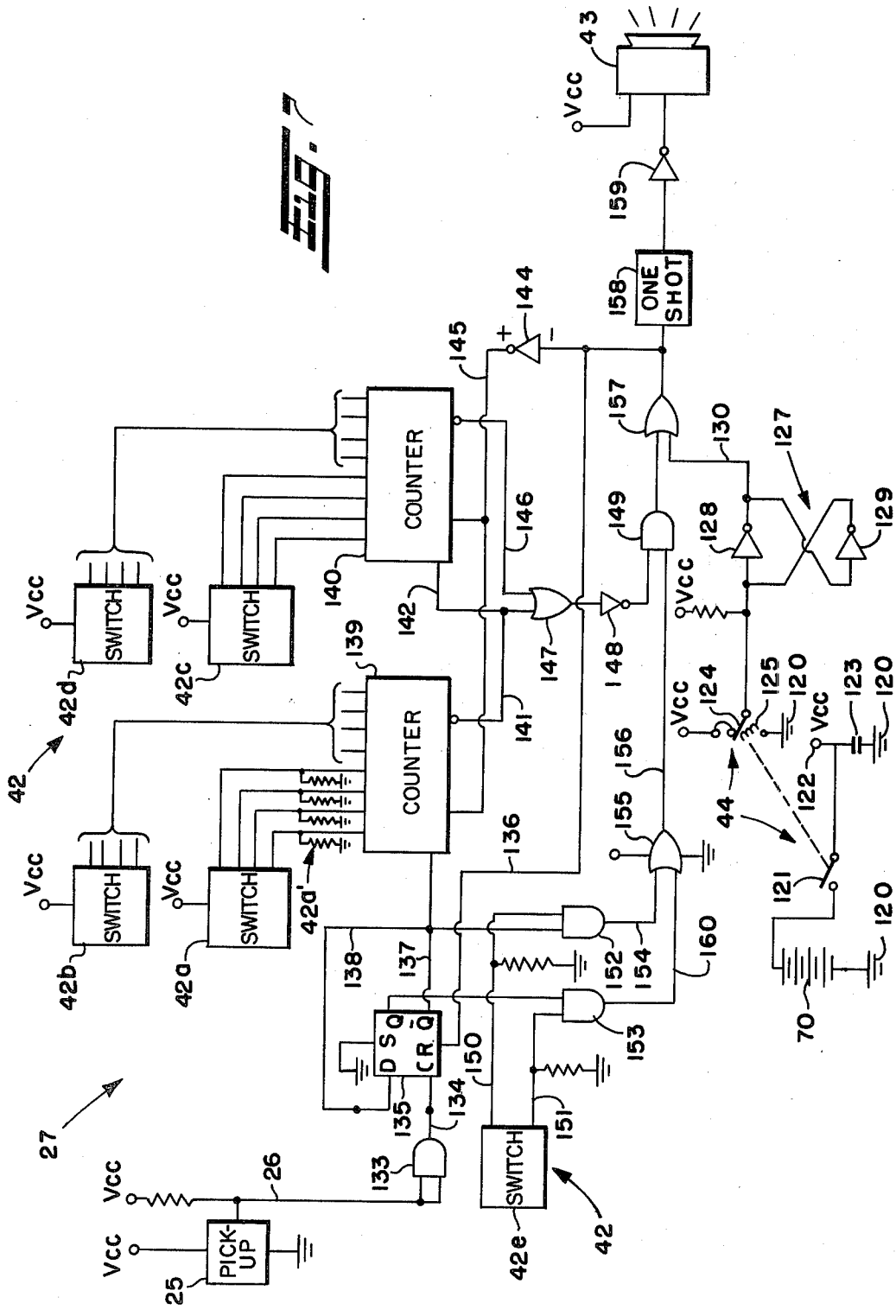
FIG. 7 is a schematic electric circuit diagram of the distance measuring circuit of the invention.

Referring now in detail to the drawings, and initially to FIG. 1, an electrical survey apparatus in accordance with the present invention is generally indicated at 1. The electrical survey apparatus is intended to be carried and operated by a single surveyor 2 and, accordingly, is relatively lightweight, conveniently portable, durable, and efficiently utilized. The apparatus 1 includes a distance measuring unit 3, one, and possibly plural, electrical potential contacting device or electrode 4, and a meter 5.

The distance measuring unit 3 includes a storage spool or other supply 10 (FIG. 2) of relatively lightweight, insulated, disposable wire 11, preferably copper, that provides two functions. One function of wire 11 is the provision of an electrical connection via a conventional test lead 12 to a buried metal pipeline 13, or other structure to be surveyed. The other function of wire 11 is to drive a distance measuring mechanism 14 which generates electrical information indicative of the length of wire paid out from the spool 10.

The spool 10 is mounted in a metal frame support 15 to deliver wire 11 to the distance measuring mechanism 14 with a spinner type action, i.e. like a conventional spinner type fishing line reel. The frame is covered by a non-metallic case 15C removably secured thereto by a belt 15B (FIG. 6), and the entire distance measuring unit is carried via a strap 15S on the shoulder of surveyor 2. Since the spool 10 does not rotate and, additionally, since the wire 11 is usually under at least minimum tension, the possibility of its binding and resulting wire breakage is eliminated and the integrity of the electrical connection of the wire 11 to the meter is maximized. A funnel 16 directs the wire 11 as it spins off the spool 10 into the distance measuring mechanism 14 where the wire is passed over a friction drive wheel assembly 17, which includes a driven roller 17D and an idler roller 17I for urging the wire 11 against the former, and through a guide pipe 18 from which it leaves the distance measuring unit 3.

The distance measuring mechanism 14 includes support frame 19 on which a drive gear 20 (FIG. 4) is mounted to rotate with the roller 17D. Moreover, the drive gear 20 rotates a sensor gear 22. Mounted in the sensor gear 22 is a pair of magnets 23, 24, or magnetically permeable members, which rotate past a Hall effect switch pick-up 25 sequentially at a speed determined by the rate at which the wire 11 is paid out from the unit 3. Leads 26 couple serial data pulses produced in the pick-up 25 as the respective magnets 23, 24 rotate past such pick-up to electronic measuring circuitry 27 in the unit 3. Other types of sensors or transducers, such as opto-isolators, may be used to produce such serial data pulses at a frequency determined by the rotational frequency of the roller 17D, although the disclosed electro-mechanical transducer is preferred over the optical type to avoid ambient light effects. A conventional mechanical counter 28 may be connected to the sensor gear 22 to provide a visual indication of the length of wire 11 paid out from the unit 3.

The spool 10 may carry up to several miles length of wire 11 due to the small gauge and light weight of such wire which is preferably magnet wire. Preferably the wire 11 has a lacquer or plastic type insulation to prevent electrical connection with the ground, metal fences, or the like as it is layed down while the surveyor walks along the ground above the pipeline 13 to conduct a survey. The spool 10 is securely mounted, but easily removable for replacement, when necessary, in the distance measuring unit 3 by a friction holding mechanism 30. The friction holding mechanism 30 includes a threaded bolt 31, which extends through an opening 32 in the base of the metal frame 15, a head 34 on the bolt, a rubber or other elastomeric material resilient cylinder or washer 35 on the bolt between the head 34 and the frame 15, and a wing nut or other tightener 36 on the bolt 31 outside the case 33. The head 34 of the bolt 31 and a substantial portion of the rubber cylinder 35 extend within the hollow central core volume 37 of the spool 10 defined by a cylindrical wall 38 of the spool. With the spool 10 positioned over the cylinder 35, tightening of the wing nut 36 will draw the bolt head 34 toward the frame 15 applying a force to expand the rubber cylinder 35 against the spool wall 38 thereby securely to hold the spool 10 in fixed position in the distance measuring unit 3. The nut 36 may be loosened to release the cylinder 35 thereby freeing the spool 10 for replacement by another one with a full load of wire wound thereon.

The distance measuring circuit 27 receives serial data pulses on leads 26 from the Hall effect switch pick-up and converts those pulses to electrical information indicating the length of wire 11 paid out from the distance measuring unit 3 and, thus, the distance the surveyor 2 has walked along the ground above the pipeline 13 away from the test lead 12. The distance measuring circuitry 27 includes a measuring interval control circuit 41 with a plurality of thumb wheel switches 42 that can be set manually by the surveyor 2 to establish the intervals at which potential difference measurements are to be taken. Typically, such intervals may be as small as one-half foot to as large as several hundred feet, and even up to about 9999.5 feet, as desired. Preferably, however, for optimum efficient use of the electrical survey apparatus 1, the intervals at which potential difference measurements are made will be on the order of $2\frac{1}{2}$ to about 50 feet. The distance measuring circuit 27 also includes a horn 43, which is energized briefly each time a length of wire 11 equal to the interval set on the thumb wheel switches 42 has been paid out from the distance measuring unit 3. The horn 43 may be one manufactured and sold by Mallory under the name Sonalert or other audible, visual or like physical signalling device that preferably does not require direct visual reading to obtain distance interval information. A reset switch 44 may be selectively operated by the surveyor 2 to reset the electrical survey apparatus 1 to commence a survey operation.

Several integrated circuits represented generally at 45 are included in the measuring interval control circuit 41 and these are mounted in conventional manner on one or more printed circuit boards e.g. as shown at 46 in the unit 3. The horn 43 and reset switch 44 also are mounted on the board 46.

Pipe potential signals are received via the test lead 12, wire 11, including that still on the spool. Such signals are delivered via a pigtail connection 47, such as an end of the wire 11, from the spool 10 to an insulated terminal post 48, which is in turn connected via a lead 49, banana plug connector 50, and external lead 51 to the meter 5 usually held by the surveyor. When the spool 10 is replaced, the pigtail connection to terminal post 48 is released and the wire is pulled through the pipe 18. The wire on the replacement spool, then, is pulled through mechanism 14 and the pipe 18 and is electrically coupled to the end of wire already connected to a test lead. The other end of the wire on the replacement spool is connected as a pigtail 47 to terminal post 48.

The electrical potential contacting device 4, e.g. the copper-copper sulfate half cell, is attached to a non-metallic cane 65. An electrical lead 67 from the half cell is taped to the cane, and the lead 67 is connected to the meter 5. The meter 5, then, measures and displays the potential difference between the pipe and soil. Other measurements also may be made, such as soil resistivity, in conventional manner.

In operation of the electrical survey apparatus in accordance with the method of the present invention, a surveyor 2 would mount the distance measuring unit 3 on his person, for example as shown in FIG. 1. The surveyor 2 also would connect an end of the wire 11 to the test lead 12, would adjust the thumb wheel switches 42 for a desired interval distance between successive potential difference measurements to be made. That interval distance would be recorded, for example, in a notebook indicating that all following potential difference measurements were made at such intervals. Then, the reset switch 44 is briefly thrown to reset the measuring interval control circuit 41 and the cane 65 and the meter 5 are taken in hand. The surveyor 2 walks along the ground above the pipeline 13 while the wire 11 is paid out from the distance measuring unit 3. Each time a distance interval equal to that set on the thumb wheel switches 42 is paid out, and, accordingly, walked by the surveyor, a measuring interval control signal briefly energizes the horn 43 to produce an audible signal. The audible signal indicates to the surveyor that a measurement should be taken by him. The surveyor stops, places the half cell 63 in contact with the soil; visually reads the meter 5; and records the potential difference value. Then the surveyor walks to the next test location as indicated by the horn 43 and so on.

Since the places at which potential differences are to be measured are automatically indicated at equidistant locations to the surveyor without continuous visual monitoring, and since the wire 11 is lightweight, long, and disposable, the latter eliminating the need for rewinding, large distances may be quickly covered by the surveyor 2 in making an effective relatively closely spaced, survey, thus improving the efficiency with which such pipeline surveys can be made. Also, since the surveyor 2 can cross difficult terrain or obstacles, such as fences, crop fields, streams, etc., quite effectively, especially relative to the ability of heavy vehicles to do so, the efficiency with which a survey can be made is further increased. The data obtained by the survey apparatus is recorded preferably in a manner to facilitate quantitative, graphical, comparative, and other analysis thereof. The survey information then may be used for efficiently cathodically protecting the surveyed pipeline.

Turning now in detail to FIG. 7, the distance measuring circuit 27 for automatically indicating to the surveyor the places at which potential difference measurements are to be made is shown in detail. Electrical power for such circuit is provided by a battery 70, which has its negative terminal connected to a source of ground reference potential 120, the symbol of which is used throughout the circuit diagram of this application, and the positive terminal of which is connected via a switch arm 121 of the reset switch 44 to a regulated $V_{cc}$ power terminal 122. A capacitor 123 provides conventional filtering for the $V_{cc}$ power signal. Other exemplary $V_{cc}$ power connections, which receive power from the terminal 122, are similarly identified by the letters $V_{cc}$ throughout the drawings. The reset switch 44 also includes a movable switch arm 124 and a spring 125. The reset switch 44 is a three-position switch, as follows: in one position, the off position, the switch arm 121 is open to deenergize the circuit 27, and the switch arm 124 is connected, as shown in FIG. 7; in the on position the switch arm 121 is closed, as shown in FIG. 7, and the switch arm 124 also remains, as shown in FIG. 7, connected to receive a $V_{cc}$ power signal; in a reset position of the switch 44, which is an unstable position resisted by the spring 125 back toward the on position, the switch arm 124 may briefly be held manually in connection with the source of ground reference potential 120 to effect the resetting of a conventional debouncing latch circuit 127. The circuit 127 includes two inverting amplifiers 128, 129 which upon being reset produce a positive manual reset signal on line 130. It is the purpose of such reset signal to effect energization of the horn 43 and a resetting of the counters, which are described below, of the distance measuring circuit 27 as will be described below. After the switch 44 is released to "on", the system 1 will be ready to operate as described in detail below.

In the distance measuring circuit 27 a conventional Hall effect switch pick-up 25 (FIG. 4) produces on line 26 a series of electrical pulses having a frequency equal to twice the rotational frequency of the sensor gear 22 since there are two magnets in the latter. Preferably, the size of the sensor gear 22 and the gear ratio thereof with respect to the drive gear 20 are selected such that a separate pulse is produced on line 26 each time 0.5 ft. of wire 11 has been paid out through the friction drive roller 17D and guide pipe 18. The pulse train on line 26 is coupled to the measuring interval control circuit 41 by a connector 132 (FIG. 2) and passes through a buffer AND gate 133 and from the latter via line 134 to a D type toggle or set, reset flip-flop circuit 135 which has complementary outputs Q and $\overline{Q}$. When the flip-flop 135 is reset by a signal on line 136, the Q output goes low. Thereafter, the Q output will go high upon receipt of the first pulse on line 134, will go low upon receipt of the next pulse on line 134, etc. Therefore, whenever the Q output is high, it is indicative of a 0.5 foot, 1.5 feet, etc., of wire having been paid out, whereas each time the $\overline{Q}$ output is high, it is indicative of a whole number of feet having been paid out from the distance measuring unit 3.

The $\overline{Q}$ output is connected by line 137 in a feed-back path via line 138 for the flip-flop 135 and to a binary coded decimal programmable down counter 139, such as an RCA integrated circuit number CD40102BE, providing a clock signal input to the latter. A similar binary coded decimal programmable down counter 140 is connected to the output line 141 of the counter 139 to receive clock signals on line 142 therefrom each time counter 139 reaches zero. To program the counters 139, 140, the thumb wheel switches 42 are connected thereto. The thumb wheel switches include four conventional thumb wheel switch assemblies, such as those manufactured by Cherry Manufacturing, 42a–42d, which may be adjusted to provide via a $V_{cc}$ connection or a ground connection through resistors 22a' illustrated, for example, with respect to switch 42a, respective logic 1 and 0 or on and off signals to respective inputs of the counters 139, 140 to set 1's, 10's, 100's, and 1000's, respectively, values or count levels from which the counters 139, 140 will count down in conventional manner in response to clock signals input thereto. Four lines shown connected between thumb wheel switch 42a and counter 139 are respectively high or low logic signal values, depending on the setting of the switch 42a, to program the counter to a value from which it must count down in response to clock signals input from line 137. Four lines similarly connect the thumb wheel switch 42b to the counter 139 for the same purpose; it is noted here that for convenience of illustration wherever parallel lines are to be connected a pair of brackets and a common single line connector such as the one shown at 143 will be illustrated. The thumb wheel switches 42c and 42d are similarly connected to program the value from which the counter 140 will count down in response to clock signals received on line 142. The counters 139, 140 may be reset by a signal from inverting amplifier 144 and line 145 effectively to store the respective values set in the thumb wheel switches 42 from which the counters will count down in response to respective clock signals thereto. When both counters 139, 140 have attained or counted down to a predetermined second level, say zero, such that the signals on their output lines 141, 146 are logic zero levels, such logic zeros are sensed by OR gate 147 which produces a logic zero that is inverted to a logic one signal by inverting amplifier 148. That logic one is delivered to a comparator AND gate 149 which compares its inputs to produce a logic 1 output only when both inputs are received, i.e. are also logic 1. The signal produced by inverting amplifier 148 is in effect a preliminary footage signal which indicates that the desired whole number footage of wire 11 as set in the thumb wheel switches 42 has been paid out from the distance measuring unit 3.

The thumb wheel switches 42 also include a further thumb wheel switch 42e, which is used to determine whether the footage or magnitude of the distance interval at which measurements are to be taken is to be a whole number or a fractional number. Specifically, the thumb wheel switch 42e may be adjusted to provide a discriminating signal, i.e. a high signal, on lines 150 or 151 for combination with a corresponding respective signal from one of the complementary Q or $\overline{Q}$ outputs of the flip-flop 135 in a pair of AND gates 152, 153. Assuming that a high signal is set on line 150 by the switch 42e, and a low signal is on line 151, each time the $\overline{Q}$ output of flip-flop 135 goes high, which indicates a whole number of feet having been paid out from the distance measuring unit, a positive signal is produced by AND gate 152 on line 154, and that positive signal is delivered by OR gate 155 and line 156 as an output control signal to the other input of AND gate 149, whereupon the latter will produce an attainment signal. The attainment signal signifies that the exact number of counts set on the switches 42 and the preset length of wire 11 paid out have been attained. The attainment signal, then, is delivered via an OR gate 157 as a measuring interval control signal to effect energization of the horn 43 and resetting of the counters 139, 140. Such control signal triggers a one-shot multivibrator 158 that energizes the horn 43 through an inverting amplifier 159 for a predetermined duration. The control signal also acts through inverting amplifier 144 to reset the counters.

Alternatively, when the thumb wheel switch 42e provides a high signal on line 151, AND gate 153 will produce a high signal on line 160 each time a 0.5 ft. length of wire 11 has been paid out from the distance measuring unit 3. As above, then, the AND gate 149 produces an attainment signal, when a footage signal also is received from inverting amplifier 148, to energize the horn 43 and to reset the counters.

Summarizing operation of the apparatus 1 including the distance measuring circuit 27, then, the surveyor sets the thumbwheel switches 42 and operates the reset switch 44 to reset such circuit. A manual reset signal on line 130 causes energization of the one-shot multivibrator 158 to operate the horn 43 and resets the counters 139, 140 via the inverting amplifier 144 and line 145. Thereafter, as the surveyor 2 walks over the pipeline 13, a plurality of pulses will be produced on line 26 causing counting down by the counters 139, 140. Each time the desired length of wire 11 has been paid out from the distance measuring unit, as set on the switches 42, a measuring interval control signal from OR gate 157 will effect energizing of the horn 43 to signal the surveyor to take a potential difference measurement and to record the data concerning the same and will effect resetting of the counters. When a survey has been completed, the data can be analyzed and used in conventional manner, for example, to provide efficient cathodic protection for the buried structure.

It will be appreciated that the flip-flop 135 effectively doubles the counting capacity of the counters 139, 140 in the measuring interval control circuit 41. The flip-flop 135 effectively passes only one-half of the serial data pulses, say the even numbered ones, on to the counters 139, 140. However, due to the discriminating circuit, which includes the AND gates 152, 153 and the OR gate 155 coupled to the complementary outputs of the flip-flop 135, the measuring interval control circuit 41, as described above, is capable of producing an attainment signal at the output of the AND gate 149 in response to either an even number or an odd number of serial data pulses, with discriminating control being effected by the further thumbwheel switch 42e. It will be appreciated that this technique of increasing the capacity of a counter while maintaining the accuracy of the output information therefrom may be applied to other types of counting circuits.

STATEMENT OF INDUSTRIAL APPLICATION

In view of the foregoing, it will be appreciated that the invention may be used to survey buried metal structures to obtain data indicative of the structure condition, particularly in relation to its environment. The data obtained may be used, for example, to facilitate efficient and effective cathodic protection of the pipeline.

We claim:

1. An apparatus for making electrical surveys of structures contained in an electrolyte, said apparatus comprising electrode means for obtaining information of an electrical parameter of the electrolyte proximate the structure at a plurality of locations, wire means having one end portion electrically coupled with respect to such structure to receive information of an electrical parameter of the structure at a reference location with respect thereto and for transmitting an electrical signal proportional to the electrical parameter of the structure at the reference location, sensing means connected with said electrode means and said wire means for electrically sensing such electrical parameters, and spinner-type storage means for storing said wire means and for paying out said wire means with a spinner-type action to accommodate movement of said sensing means between said locations while said wire means remains electrically coupled with respect to such structure, said spinner-type storage means including a spool about which said wire means is wound, said spool being non-rotating during such paying out of said wire means therefrom, said wire means having an electrical pigtail-like end portion emanating at said spinner-type storage means electrically connected with said sensing means.

2. The apparatus of claim 1, said electrode means comprising a copper-copper sulfate half cell.

3. The apparatus of claim 1, said wire means comprising a supply of lightweight, insulated magnet-type wire.

4. The apparatus of claim 1, said sensing means for electrically sensing comprising means for sensing potential difference, and such electrical parameters comprising electrical potential.

5. The apparatus of claim 1, further comprising means driven by said wire means for measuring the length of wire payed out from the apparatus as the latter is transported along the structure, whereby at respective measured distances along the structure such potential difference may be sensed.

6. The apparatus of claim 1, said further comprising a support and mounting means for mounting said spool with respect to said support with the axis thereof in a vertical orientation for dispensing of said wire means therefrom also in a vertical direction by a spinner-type action.

7. The apparatus of claim 6, said mounting means including resilient means for frictionally retaining said spool, and force applying means for deforming said resilient means into frictional engagement with said spool, said spool having a hollow core and being positioned on said support with said resilient means located within said hollow core.

8. The apparatus of claim 6, said mounting means including means for prohibiting rotation of said spool, and further comprising guide means for guiding pay out of said wire means from said spool with a spinner-type action.

9. The apparatus of claim 8, said means for automatically measuring comprising roller means positioned in abutment with said wire means for rotating in response to movement of said wire means as it is payed out from said storage means, and data means for producing serial data at a frequency proportional to the rotational speed of said roller means.

10. The apparatus of claim 8, said guide means comprising conical means vertically above said spool for guiding said wire means spun off said spool, and outlet means aligned with respect to said conical means for delivering said wire externally of said support for pay out thereof as the support is transported above the structure.

11. The apparatus of claim 1, said sensing means for electrically sensing comprising an electric meter, and further comprising first and second electrical conductor means for respectively electrically connecting said electric meter to said wire means and to said electrode means.

12. The apparatus of claim 1, further comprising means for automatically measuring the length of said wire means payed out from said storage means, including roller means positioned in abutment with said wire means for rotating in response to movement of said wire means as it is payed out from said storage means, data means for producing serial data at a frequency proportional to the rotational speed of said roller means, counter means for counting such serial data as an indication of the length of said wire means payed out from said storage means, sensing means for sensing each time said counter means counts a predetermined number of counts, and further comprising means for coupling said sensing means and said means for producing to cause the latter to produce a signal each time such predetermined number of counts has been counted by said counter means.

13. The apparatus of claim 12, wherein each count by said counter means represents a predetermined length of said wire means paid out from the apparatus, and further comprising adjusting means for adjusting the number of counts cyclically counted by said counter means.

14. The apparatus of claim 12, wherein said means for producing a signal comprises means for producing an audible signal.

15. An apparatus for making electrical surveys of structures contained in an electrolyte, comprising: electrode means contactible with the electrolyte proximate the structure at a plurality of locations, wire means having one end portion electrically coupled with respect to such structure at a reference location for receiving at such one end portion and transmitting through said wire means an electrical signal proportional to an electrical parameter of the structure at the reference location with respect thereto, spinner-type storage means for storing said wire means for pay out thereof with a spinner-type action, means for electrically sensing the potential difference between said electrode means and said wire means, said storage means comprising a spool, said wire means being wound on said spool with one end free for paying out with such spinner-type action and an exposed relatively immovable electrical pigtail-like opposite end, said spool being non-rotating during such pay out of said wire means therefrom, and electrical connection means for electrically connecting said opposite end of said wire means in circuit connection with said means for electrically sensing.

16. The apparatus of claim 15, further comprising means driven by said wire means for measuring the length of wire payed out from the apparatus as the latter is transported along the structure, whereby at respective measured distances along the structure such potential difference may be sensed.

17. The apparatus of claims 15 or 16, said wire means comprising means for electrically and mechanically connecting the apparatus with the structure.

18. The apparatus of claims 1 or 15, further comprising a support and mounting means for mounting said storage means with respect to said support for pay out with such spinner-type action.

19. An apparatus for making electrical surveys of structures contained in an electrolyte, said apparatus comprising electrode means for obtaining information of an electrical parameter of the electrolyte proximate the structure at a plurality of locations, wire means electrically coupled with respect to the structure for receiving information of an electrical parameter of the structure at a reference location with respect thereto, sensing means connected with said electrode means and said wire means for electrically sensing such electrical parameters, spinner-type storage means for storing said wire means and for paying out said wire means with a spinner-type action to accommodate movement of said electrode means between said locations, a support, and mounting means for mounting said storage means on said support, said mounting means including resilient means for frictionally retaining said storage means and force applying means for deforming said resilient means into frictional engagement with said storage means.

20. The apparatus of claim 19 wherein said force applying means includes means for deforming said resilient means into engagement with an interior surface of said storage means.

21. The apparatus of claim 19, said storage means comprising a spool having a hollow core, said spool being positioned on said support with said resilient means located within said hollow core.

22. The apparatus of claim 21, said resilient means comprising a washer-like member, and said force applying means comprising means for securing said washer-like member to said support, said means for securing including means for deforming said washer-like member in one direction to effect expansion thereof in another direction into secure frictional engagement with said spool.

23. A method for making a structure-to-electrolyte potential difference survey, comprising the steps of: providing a supply of elongate electrical conductor wound on a spool for spinner-type pay out of one end of the conductor while the other end of the conductor remains relatively fixed with respect to such spool and such spool does not rotate, electrically connecting the conductor at least proximate such one end thereof to a reference location with respect to the structure to obtain information of an electrical parameter of the structure, paying out the conductor along the structure while transporting the supply of the conductor to test locations along the structure, said paying out comprising paying out such conductor from such spool with a spinner-type action, contacting the electrolyte at such test locations proximate the structure with a reference electrode to obtain information of an electrical parameter of the electrolyte, and electrically connecting the other end of the conductor to a means for sensing such electrical parameters.

24. The method of claim 23, further comprising electrically connecting such reference electrode to the means for sensing.

25. The method of claim 23, wherein the electrical parameters are electrical potentials, and further comprising measuring the potential difference at each such test location between the reference electrode and the conductor using the means for sensing, said step of paying out comprising manually transporting the supply of conductor along the length of such structure, and further comprising automatically measuring the length of conductor payed out as an indication of the distance the supply is transported, including producing serial data pulses at a frequency proportionally representative of the rate at which such conductor is payed out, whereby the number of serial data pulses so produced is proportionally representative of the length of wire so payed out, and counting such pulses with an electrical counter.

26. The method of claim 23, said paying out comprising paying out the conductor through a distance measuring device.

27. The method of claim 26, further comprising automatically measuring the length of conductor payed out as an indication of the distance the supply is transported.

28. The method of claim 27, further comprising automatically producing a brief signal each time a predetermined length of conductor representing the distance between test locations has been payed out.

29. The method of claim 28, said step of paying out comprising manually transporting the supply of conductor along the length of such structure.

30. The method of claim 29, said step of manually transporting comprising walking, and further comprising stopping at each test location as indicated by such brief signal to measure the potential difference thereat.

31. The method of claim 28, said step of automatically producing comprising producing an audible signal.

32. The method of claim 28, said step of automatically measuring comprising producing serial data pulses at a frequency proportionally representative of the rate at which such conductor is payed out, whereby the number of serial data pulses so produced is proportionally representative of the length of wire so played out, and counting such pulses with an electrical counter.

33. The method of claim 32, said step of counting comprising cyclically counting a predetermined number of such pulses, such predetermined number representing the interval distance between adjacent test locations, and further comprising resetting such electrical counter each time a cyclical count has been completed, and said step of automatically producing comprising producing such brief signal approximately at the same time each such cyclical count is completed.

34. The method of claim 33, further comprising the step of resetting such electrical counter at the beginning of a survey.

35. The method of claim 33, further comprising the step of presetting the interval distance between adjacent test locations, said step of presetting including manually setting the number of counts contained in each cyclical counting operation of such electrical counter.

36. The method of claim 23, further comprising the step of presetting the magnitude of the interval distance between adjacent test locations.

37. The method of claim 23, further comprising recording the magnitude of the interval distance between adjacent test locations.

38. The method of claims 23, 35, or 37, further comprising the step of recording the potential difference at each such test location between the reference electrode and the conductor.

39. The apparatus of claim 1, such survey being a relatively closely spaced survey, said electrolyte comprising primarily soil, said first electrode being adapted to contact the surface of such soil above the structure.

40. The method of claim 23, such electrolyte comprising primarily soil, and said step of providing comprising providing a portable supply of lightweight small gauge, disposable, flexible conductor.

41. An apparatus for making electrical surveys of structures contained in an electrolyte, comprising: electrode means contactible with the electrolyte proximate the structure, electrical and mechanical means for electrically and mechanically connecting the apparatus with the structure at a reference location thereon, said electrical and mechanical means including wire means, storage means for storing said wire means, means for electrically sensing the potential difference between said electrode means and said wire means, means driven by said wire means for automatically measuring the length of wire payed out from the apparatus as the latter is transported along relative to the structure, including means for producing a signal each time a predetermined length of wire is payed out from the apparatus as an indication of respective measured distances along such structure at which such potential difference is to be sensed, a support, said storage means comprising a spool on which said wire means is wound, said spool having a generally linear axis, and mounting means for mounting said spool relative to said support with such axis oriented in generally vertical direction, said spool including a hollow core, and said mounting means comprising a frictional mount including a resilient member positioned in said hollow core, and means for applying force to said resilient member thereby expanding the same to frictional engagement with said spool from within said core.

42. An apparatus for making electrical surveys of structures contained in an electrolyte, comprising: a support, electrode means contactible with the electrolyte proximate the structure, wire means for electrically and mechanically connecting the apparatus with the structure at a reference location thereon, storage means for storing said wire means on said support, mounting means for mounting said storage means on said support for pay out therefrom with a spinner-type action, said mounting means including resilient means for frictionally retaining said storage means, and force applying means for deforming said resilient means into frictional engagement with said storage means, means for electrically sensing the potential difference between said electrode means and said wire means, and means driven by said wire means for measuring the length of wire payed out from the apparatus as the latter is transported along the surface above the structure, whereby at respective measured distances along such structure such potential difference may be sensed.

43. An apparatus for making electrical surveys of structures contained in an electrolyte, comprising: a support, electrode means contactible with the electrolyte proximate the structure, wire means for electrically and mechanically connecting the apparatus with the structure at a reference location thereon, storage means for storing said wire means on said support, mounting means for mounting said storage means on said support for pay out therefrom with a spinner-type action, means for electrically sensing the potential difference between said electrode means and said wire means, and means driven by said wire means for measuring the length of wire payed out from the apparatus as the latter is transported along the surface above the structure, whereby at respective measured distances along such structure such potential difference may be sensed, said storage means comprising a spool, and said mounting means including means for mounting said spool on said support in a generally vertical orientation, and comprising resilient means for frictionally retaining said spool, and force applying means for deforming said resilient means into frictional engagement with said spool, said spool having a hollow core and being positioned on said support with said resilient means located within said hollow core.

44. The apparatus of claim 43, said storage means comprising a spool having a hollow core, said spool being positioned on said support with said resilient means located within said hollow core.

45. The apparatus of claim 44, said resilient means comprising a washer-like member, and said force applying means comprising means for securing said washer-like member to said support, said means for securing including means for deforming said washer-like member in one direction to effect expansion thereof in another direction into secure frictional engagement with said spool.

* * * * *